Feb. 19, 1946.　　　M. KAZAMIAS ET AL　　　2,395,188
SUPPORT FOR FILLING CARRIERS
Filed May 30, 1942　　　2 Sheets-Sheet 1

Inventors
Michael Kazamias
Frank Gutala
Nathaniel Frucht
Attorney

Feb. 19, 1946.   M. KAZAMIAS ET AL   2,395,188
SUPPORT FOR FILLING CARRIERS
Filed May 30, 1942   2 Sheets-Sheet 2

Inventors
Michael Kazamias
Frank Gubala
Nathaniel Frucht
By
Attorney

Patented Feb. 19, 1946

2,395,188

UNITED STATES PATENT OFFICE 2,395,188

SUPPORT FOR FILLING CARRIERS

Michael Kazamias and Frank Gubala, Pawtucket, R. I.

Application May 30, 1942, Serial No. 445,230

4 Claims. (Cl. 139—258)

The present invention relates to automatic looms, and has particular reference to the filling and replenishing thereof.

In automatic looms of the Draper type, means are provided for transferring a fresh supply of filling from a hopper or feeder to the shuttle, an illustrative feeder consisting of two circular plates which are arranged to rotate intermittently and in unison, and to hold a series of filling carriers between them which are transferred successively to the shuttle by suitable transfer mechanism. If the filling is not aligned with the shuttle the transfer to the shuttle sometimes causes breakage of the filling end before it can unwind quickly enough from the filling carrier which is being transferred.

The principal objects of the present invention are to prevent breakage of the filling by keeping the filling in alignment with the shuttle end by providing a support for the cut portion of filling after transfer to keep it out of the path of the picker.

With the above and other objects and advantageous features in view, the invention consists of a novel arrangement of parts more fully disclosed in the detailed description following, in conjunction with the accompanying drawings, and more specifically defined in the claims appended thereto.

Figure 1:
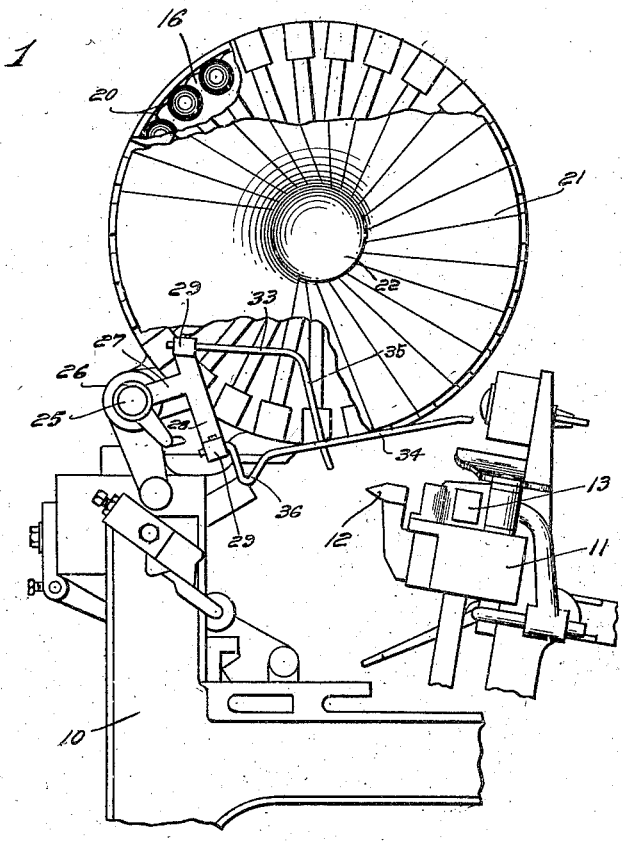
Fig. 1 is a side elevation of a loom portion and filling-replenishing mechanism therefor, equipped with the novel slack support.

The loom frame 10 is equipped with a lay 11 having a bunter 12 and a self-threading shuttle 13, and with a stand 14 which is of circular form and is mounted transversely of the breast-beam 15 to support the filling feeder disks 16, 17. These disks are connected to rotate in unison by a hub 18 which is rotatably mounted on a stud 19 fixed on the stand 14, the filling carriers 20 being held at their ends between the two disks. A filling end holder is provided at the outer end of the feeder, consisting of a disk 21 which has a stud 22, the hub of the disk 21 being secured to a boss 23 projecting from the outer face of the disk 17, by means of a set-screw or the like.

The filling ends 24 are led from the periphery of the disk 17 to the disk 21 and then around the stud 22; between these two disks a length of filling is provided to prevent shock due to pull or strain at the time of transfer of the filling carrier to the shuttle.

A fixed horizontal stub shaft 25 is provided on the stand 14, on which shaft a hub 26 is mounted in position by means of a set screw or the like, the hub having an arm 27 which terminates in a cross bar 28 provided at its ends with rod support bosses 29 in which rods 30 are mounted, their ends in turn carrying rod support bosses 31, 32, the boss 31 having a bent rod 33 seated therein, and the boss 32 having an elongated rod 34 mounted therein, the end 35 of the bent rod extending towards and beyond the rod 34, but spaced slightly to let the filling through when cut after the carrier is transferred.

Figure 2:
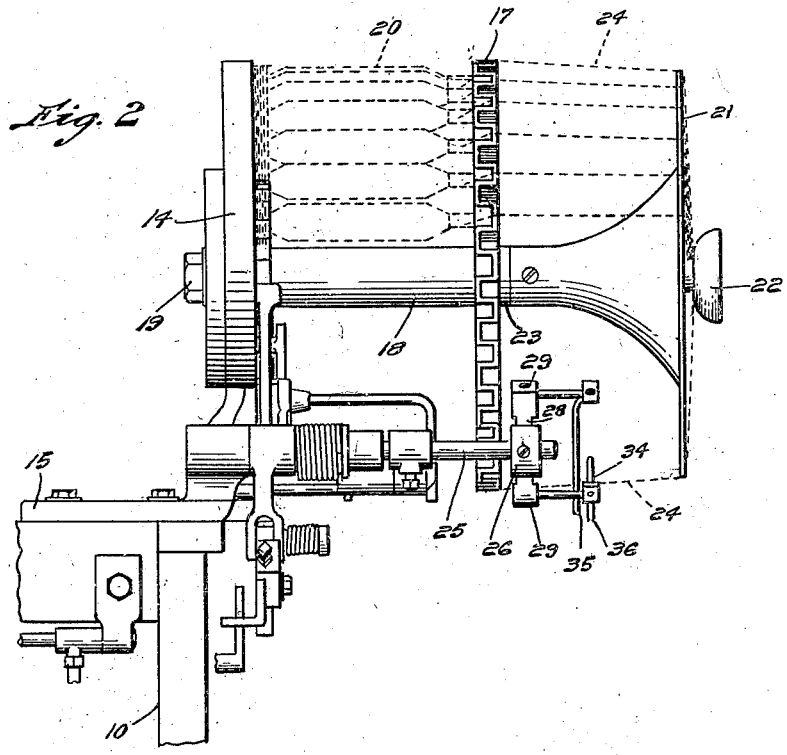
Fig. 2 is a front elevation thereof.
Figure 3:
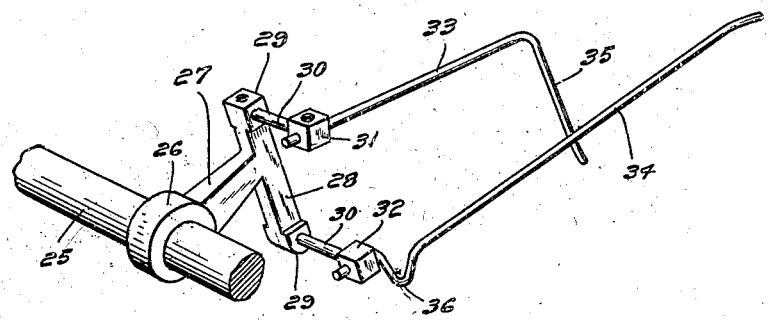
Fig. 3 is a perspective view of the novel slack support.

The above described assembly constitutes a filling support when mounted between the disks 17 and 21 as illustrated in Fig. 2, the parts being adjustable to set the support so that the slack portion of the filling rests on the extended rod 34.

When the stand and its carriers turn and the transferrer is depressed to engage and transfer the lowermost filling carrier of the series to the shuttle, the filling seats on the wire 34 and travels down until it reaches the downwardly extending rod 35, which acts as a stop or check to keep the filling in proper alignment with the shuttle. When the end of the filling is cut after the transfer, the loose end travels down the wire 34, and past the rod 35, which is spaced away from the wire 34 as shown on Fig. 2, to seat in the crotch 36, where it is out of the path of the picker movement.

The novel support construction consists of a small number of readily assembled inexpensive parts which are adjustable to obtain the desired support holding of the filling. Although a specific constructional embodiment of the invention has been described and illustrated, changes in the size, shape, and arrangement of the parts may be made to suit different loom constructions, without departing from the spirit and the scope of the invention as defined in the appended claims.

We claim:

1. In combination, a loom frame, a rotatable feeder mounted thereon and adapted to contain a supply of filling carriers, a filling end holder secured thereto and rotatable therewith, a fixed shaft on said frame extending adjacent said feeder, and a filling support mounted on said shaft and including an elongated rod extending between the feeder and the filling end holder and adapted to guide the filling, and a stop for limiting sliding movement of the filling end along said elongated rod.

2. In combination, a loom frame, a rotatable feeder mounted thereon and adapted to contain a supply of filling carriers, a filling end holder secured thereto and rotatable therewith, a fixed shaft on said frame extending adjacent said feeder, and a filling support mounted on said shaft and including an elongated rod extending between the feeder and the filling end holder and adapted to guide the filling, and a downwardly extending rod constituting a stop for limiting sliding movement of the filling end along said elongated rod.

3. In combination, a loom frame, a rotatable feeder mounted thereon and adapted to contain a supply of filling carriers, a filling end holder secured thereto and rotatable therewith, a fixed shaft on said frame extending adjacent said feeder, and a filling support mounted on said shaft and including an adjustably positioned elongated rod extending between the feeder and the filling end holder and adapted to guide the filling, and a stop for limiting sliding movement of the filling end along said elongated rod.

4. In combination, a loom frame, a rotatable feeder mounted thereon and adapted to contain a supply of filling carriers, a filling end holder secured thereto and rotatable therewith, a fixed shaft on said frame extending adjacent said feeder, and a filling support mounted on said shaft and including an adjustably positioned elongated rod extending between the feeder and the filling end holder and adapted to guide the filling, and a downwardly extending adjustably positioned rod constituting a stop for limiting sliding movement of the filling end along said elongated rod.

MICHAEL KAZAMIAS.
FRANK GUBALA.